United States Patent Office 2,719,437
Patented Oct. 4, 1955

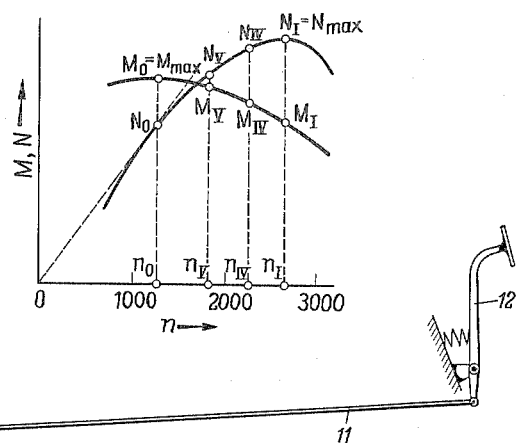
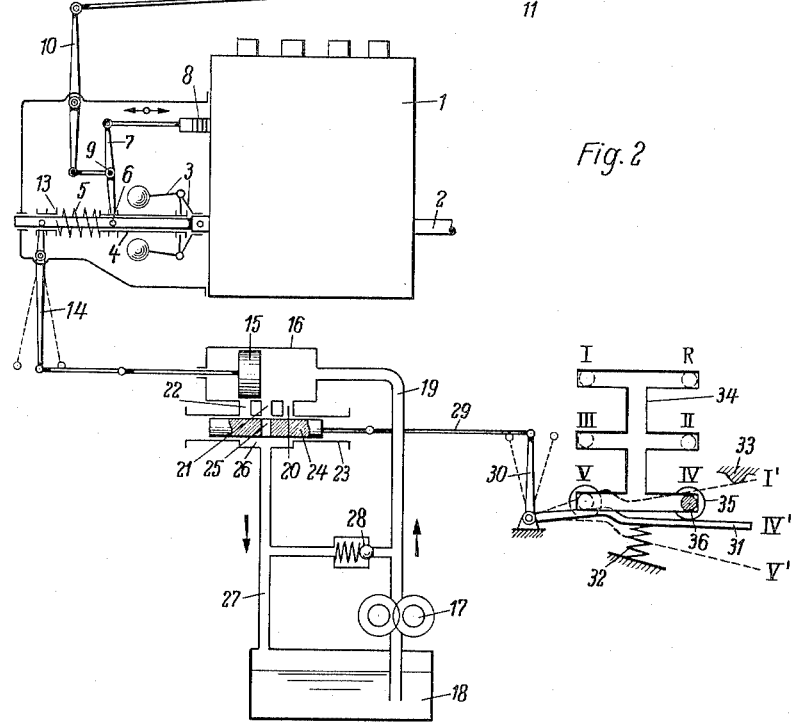

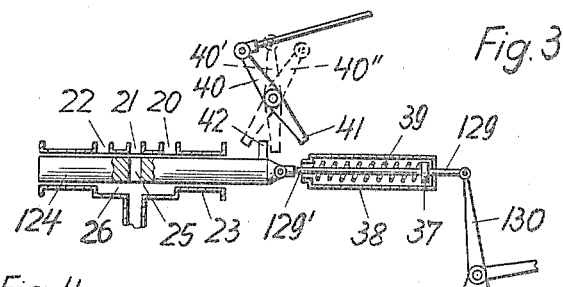
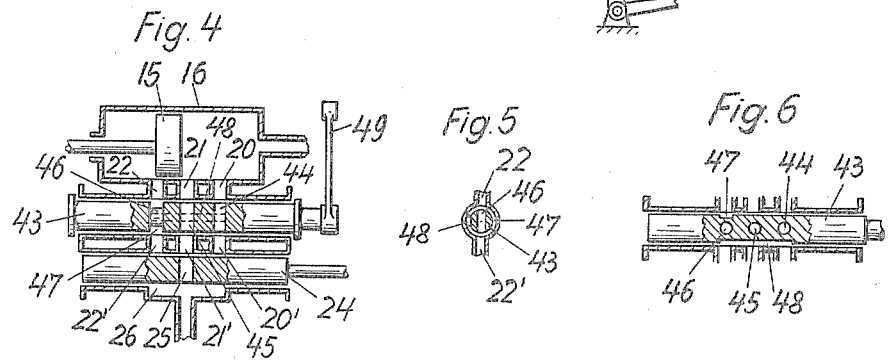
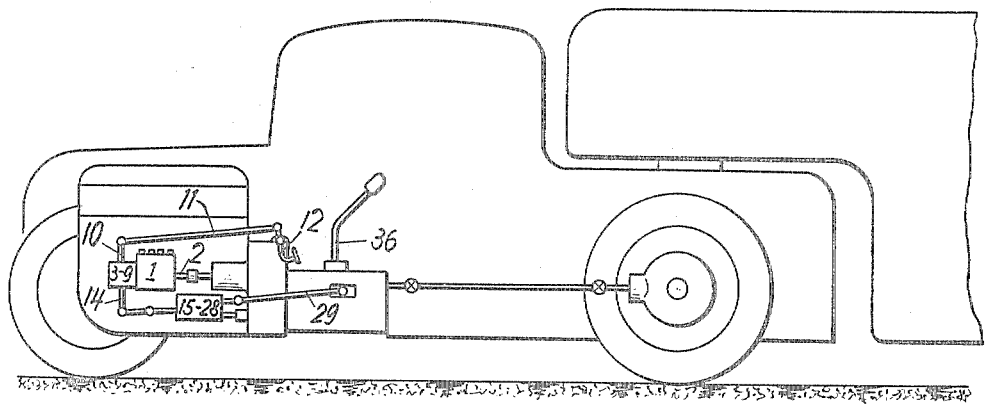

2,719,437

DEVICE FOR THE CONTROL OF VEHICLE ENGINES

Friedrich K. H. Nallinger, Stuttgart, Germany, assignor to Daimler-Benz Aktiengesellschaft, Stuttgart-Unterturkheim, Germany Application April 22, 1950, Serial No. 157,449

Claims priority, application Germany April 30, 1949

5 Claims. (Cl. 74—472)

The invention relates to a method and a device for the control of vehicle engines, especially for long distance vehicles, and aims above all at a better working economy. At the same time the engine is subjected to more careful use and the life thereof is prolonged. On the other hand, however, also the requirements for giving a high performance can still be fulfilled.

With engines of vehicles which are used for long distances, as for instance long distance trailer- or long distance autobus-service, a possibly small wear is to be desired with regard to the economy. This requires relatively low speeds, especially for obtaining a small cylinder wear. On the other hand, however, it is desirable to achieve high engine speeds in order to obtain a high acceleration as well as a sufficient performance when climbing up-hill, and thus to grant good driving characteristics of the vehicle.

In order to combine these requirements which at first seem contradictory, the invention provides a control of the machine in such a way that the maximum speed achievable by the engine is controlled dependent upon the transmission inserted between engine and vehicle, especially in such a way that the maximum speed achievable by the engine, that means generally the maximum speed of the machine admitted by a speed governor, is reduced with the shifting to a higher gear. For instance, a speed governor controlling the performance of the machine is, for this purpose, adjusted dependent upon the shifting of the transmission in its reacting (becoming effective) at a higher or a lower speed, for instance, by changing the spring tension.

Suitably the control, for example the limitation of the engine speed, is provided in such a way that, while the vehicle runs in any one or more of the lower gears at the maximum speed admitted by the governor, the maximum performance achievable according to the performance diagram of the engine is achieved, while the reduced maximum speed admitted by the governor is attainable in one or more of the high gears still above that speed at which the engine develops the highest torque. The high gears are therefore to be geared generally at such a ratio that for achieving the desired maximum speeds only the reduced engine speed is required. By this control it is granted that the engine can on the one hand be quickly accelerated with low gears shifted in, or it can develop a high performance in case of need—for instance when climbing up-hill—and has on the other hand still a certain performance reserve in the higher gears, at a careful and fuel saving speed. If, for instance, the car comes to a hill with higher gears shifted in, the torque is still increasing while the speed is reduced, which allows the car to climb up the hill at least partially without immediately shifting to a lower gear.

The reduction of the maximum speed admitted by the governor can be provided only in one or more of the higher gears or also in all higher gears, as desired. The reduction can be effected from gear to gear, from gear group to gear group or, (in the case of a stage-less shifting) continuously, in such a way that the maximum speed is reduced all the more, the higher the transmission ratio is.

In some cases a device can be provided by which the reduction of the maximum speed admitted by the governor can be made ineffective.

The different between the control according to the invention and the usual arrangements consists therefore essentially in the fact that it is not left to the balance of air and driving resistance to get a speed limit of the engine in the highest gear, but that an additional control of the maximum speed dependent upon the gear shifting is provided. By this the desired speed limit is in any case permissible in a reliable way. The engine is spared and fuel saved.

In the accompanying drawings

Fig. 1 illustrates a performance—and torque-diagram of a vehicle engine;

Fig. 2 a first embodiment for the control of a vehicle diesel engine according to the invention; and Figs. 3 and 4–6 are two modifications of the embodiment of Fig. 2.

Fig. 7 illustrates the engine, transmission and controls therefor located in association with vehicle structure.

In Fig. 1 the performance N and the torque M are indicated above the engine speed $n$. The vehicle transmission is assumed to serve for the shifting of 5 forward gears (I to V). In the first 3 gears a maximum speed of $n_I$ (for instance 2700 R. P. M.) is assumed to be admitted by the governor. At this speed a performance of $N_I = N_{max}$ is reached. The torque at this speed is $M_I$.

In the 4th gear the governor is controlled in such a way that only a speed of $n_{IV}$ (for instance 2300) and therefore a performance $N_{IV}$ is admitted. The torque is $M_{IV}$. If the 5th gear is shifted in, the maximum speed admitted is further reduced to $n_V$ (for instance 1800–2000) and the performance to $N_V$. The speed $n_V$ is here chosen in such a way that it is still sufficiently higher than the speed $n_0$, at which the torque $M_0$ reaches a maximum. If therefore the car climbs up-hill with the 5th gear shifted in, the speed can further be reduced from $n_V$ to $n_0$ (resp. the performance from $N_V$ to $N_0$) without the next low gear being necessarily shifted in.

In the example according to Fig. 2 a fuel injection pump 1 driven by the drive shaft 2 of the engine also drives a governor 3 which controls a shifting sleeve 4 in opposition to a governor spring 5. In the shifting sleeve 4 a lever 7 is inserted by means of a pin 6. The other end of the lever 7 adjusts the control member 8, for instance a control rack turning the pump pistons and thus changing the fuel injection quantity. The pivot point 9 of the lever is connected with a lever 10 which can be adjusted by the driver through the rods 11 for instance by the accelerator lever 12.

The governor spring 5 is furthermore supported on a spring support 13 which is adjustable in the axial direction of the spring by a lever 14. The lever 14 is adjusted by a piston 15 which slides in the cylinder 16. The movement of the piston 15 against the spring 5 is for instance effected by oil pressure. For this purpose a pump 17 sucks oil from a tank 18 or the like and forces it through a pipeline 19 into the cylinder 16. The cylinder 16 is connected through three openings 20, 21, 22 with a cylinder 23 in which a slide valve 24 with the cross bore 25 slides. A groove 26 on that side of the cylinder 23 lying opposite to the bores 20, 21, 22 is connected with a pipeline 27 leading back to the tank 18. A safety-valve 28 can be provided for reasons of security.

The slide valve 24 is connected by the rod 29 with a bell-lever 30—31 having a straight lever arm 30 and a second curved lever arm 31. Under the pressure of a spring 32 lever arm 31 normally abuts against a stop 33 (position I' of the lever arm 31) and extends into the path of movement of a shifting plate 34 to which a shifting lever 36 is connected, indicated in its cross section and cammed in the vicinity of the lever arm 31 for instance with a roll 35 or the like. The different shifting positions of the shifting lever are here indicated with I to V for the forward gears and with R for the reverse gear.

If the shifting lever 36 is in the shifting positions R or I to III, the lever arm 31 lies against the stop 33 (dotted position I'), as mentioned before. The slide valve 24 is in its left position, so that the bores 20 and 21 are locked and only the bore 22 is connected with the groove 26 by the cross bore 25. The oil conveyed by the pump 17 thus forces the piston 15 back until the oil can flow back into the pipeline 27 through the bores 22 and 25. In this left end position of the piston 15 the spring collar 13 is in its right end position, so that the tension of the spring 5 is at its maximum. The governor 3 will therefore work only at a high speed (for instance 2700) and thus put the control member 8 into the blocking position only at this speed.

If the 4th gear is shifted in, the lever arm 31 is adjusted into the position IV' by the cam or the roll 35. In this case the cross bore 25 connects the bore 21 with the return pipe 27, by which the piston 15 goes back to the mean position shown in the drawing. The governor spring 5 is relaxed and the governor 3 works already at a low speed (for instance 2300).

If the 5th gear is shifted in, the lever arm 31 is moved still farther (position V'), and the bore 20 is brought into connection with the groove 26 and the return pipe 27 by the cross bore 25. The piston 15 assumes its right end position, and the spring collar 13 its left end position. The governor works at a still lower speed (for instance 1800–2000).

The working of the governor depends here only upon the speed, no matter in which position is the control member 8. If the operating lever 12 is not moved, the lever 7 moves round the pivot point 9. With an arbitrary regulation by the driver (for instance by the accelerator 12) the lever 7 pivots round the pin 6, so that the arbitrary regulation can be effected independent of the governor, as long as the maximum speed admitted thereby is not reached.

Of course the arbitrary and the automatic regulations can also be effected by special independent control members. Furthermore the governor can also consist, for instance of a hydraulic or pneumatic governor. Instead of the governor working through a servo-motor (slide valve 24 and piston 15) a direct connection of the governor can be provided, if the control forces can be engaged in another suitable way. The regulation of the maximum speed admitted can also be effected by a rotary slide valve which on the one hand controls the different gear positions for the transmission and on the other hand regulates the corresponding governor positions. Especially in this case an influence of the governor at all higher speeds can be obtained in a simple way.

If it is desired to render inoperative that portion of the device which limits the maximum engine speed, means may be provided for example within reach of the driver which enable the fluid circulation to be controlled by adjustment of the slide valve 24 additionally to or independently of the displacement occasioned by the shifting plate 34.

In Figure 3 there is illustrated a device of this nature wherein the bell-crank lever 130 corresponding to the bell-crank lever 30 of Figure 2 and actuated by a similar shifting plate 34 is connected by a composite rod 129, 129' with the slide valve 124 for controlling the fluid circulation corresponding the slide valve 24 of Figure 2. Either of the parts 129 or 129' may be provided with a casing or cylinder 38 in which the other of the two parts is slideable in such a manner that an abutment 37 is normally held by a spring 39 against the casing 38. By actuating the bell-crank lever 130, the rod 129, 129' is shifted as a unit so that the same effect is obtained as in Figure 2. It is assumed in this instance that a lever 40 actuatable for example by hand from the driver's seat is in the fully extended position. In this case the slide valve 124 can run its full course and selectively take up the positions wherein the transverse bore 25 is in alignment with the openings 20, 21, or 22 of the cylinder 16. If the lever 40 is placed in the intermediate position indicated in broken lines at 40', movement of the bell-crank lever 130 toward the right will cause movement of the slide valve 124 only so far as is permitted by the engagement of the abutment 42 with the lower end of the lever 40. Accordingly only the openings 22 or 21 can communicate with the transverse bore 25. If for example upon engagement of the fifth gear bell-crank lever 130 rotates further in a clockwise direction, the slide valve 134 is held against further movement by the engagement of the abutment 42 with the lower end 41 of the lever 40 thereby compressing the spring 39 in the casing 38. In the position 40" of the lever 40, the slide valve 124 can establish a communication of only one opening, namely opening 22 with the groove 26 and the pipe line 27. In such position the fluid pressure in the cylinder 26 must rise to such a value that the piston 15 moves beyond the opening 22 and the engine will, therefore, be adjusted to its maximum speed. It is, of course, clear that the abutment end 41 of the lever 40 may be provided in some other manner or on some other movable member which may also be power operated.

In the embodiment illustrated in Figures 4 to 6 the same effect as is obtained in the embodiment of Figure 3 may be obtained by providing a rotary valve 43 having three transverse bores 44, 45, and 46 and an annular groove 47 connecting the transverse bore 46 with a longitudinal bore 48. Rotation of the rotary valve is controlled by a lever 49, for example within the driver's reach. In the position indicated for lever 49 the openings 20, 21, and 22 are in communication through bores 44, 45, and 46 with the openings 20', 21', and 22' so that movement of the slide valve 24 will have the same effect as in Figure 2. If, however, the rotary valve 43 is rotated 90° to a position corresponding to that shown in Figure 6, the openings 20 and 21 will be closed while opening 22 is connected through the annular groove 47 and the longitudinal groove 48 with all three of the openings 20', 21', and 22'. In this position no matter where the slide valve 24 is located, the fluid can pass only through opening 22 so that the engine is necessarily adjusted to its maximum speed.

What I claim is:

1. In a vehicle, an engine for driving the vehicle, a changeable transmission coupled with the engine, a shifting mechanism for the transmission, a performance control member for the engine, a control device responsive to the engine speed, means connecting the performance control member to the control device for adjustment thereby in response to variations of engine speed, a control member adjustable at will, means for adjusting the performance control member by actuation of the control member adjustable at will, said means being adapted to adjust the performance control member in substitution for the control device through a low range of engine speed and concurrently with the control device outside said range of engine speed, and an adjustment device influencing the control device and actuatable by the shifting mechanism and comprising a servo-mechanism and a member adjustable to reduce the maximum engine speed upon shifting of the transmission to a higher gear ratio.

2. In a vehicle, the combination according to claim 1 further comprising an additional device actuatable at will to cooperate with the servo-mechanism to inhibit the influence of gear shifting upon the engine's speed.

3. In a vehicle, a driving motor, a change speed mechanism coupled to the motor, a performance control member for the motor, a control device responsive to engine speed, means connecting the performance control member to the control device for adjustment thereby in response to variations of engine speed, a shifting lever for shifting the change speed mechanism in such a manner that upon shifting from a lower to a higher gear ratio the shifting lever is movable transversely to the shifting movement, a lever operatively connected with the shifting lever for movement thereby upon said shifting when said shifting lever is moved in said transverse direction, the movement imparted to said lever by said shifting lever differing for each respective shift of gears, means actuatable by said lever to influence said control device to reduce the maximum engine speed upon shifting to a higher gear ratio relatively to the engine speed at a lower gear ratio, and an additional device actuatable at will and cooperating with said means to inhibit the influence of shifting on the engine speed comprising a further control member actuatable at will and means for adjusting the performance control member in response to adjustment of said further control member in substitution for the control device through a low range of engine speed and concurrently with the control device outside said range of engine speed.

4. In a vehicle, an engine, at least one vehicle wheel driven by the engine, a changeable transmission between the engine and the wheel, a shifting mechanism for the transmission including a shifting lever movable in one direction for shifting from a lower to a higher gear and in a direction transverse thereto and an engine speed control mechanism comprising a speed governor dependent on the speed of the engine, a performance control member actuated by the governor and limiting the speed and a hydraulic servo-mechanism coupled with the shifting mechanism for adjustment thereby to vary the speed limit achieveable by the engine, said servo-mechanism comprising a displaceable piston, a slide valve controlling the displacement of the piston, and a lever mechanism actuating the slide valve, the lever mechanism being connected to the shifting lever for actuation thereby upon shifting from a lower to a higher gear and upon movement of the shifting lever in said transverse direction.

5. In a vehicle, an engine, at least one wheel driven by the engine, a changeable transmission between the engine and the wheel, a shifting mechanism for the transmission, a control mechanism comprising an adjustable rotary speed governor coupled to said engine and including a spring mechanism determining the maximum number of revolutions per unit of time permitted by said speed governor in said engine, a cylinder, a piston displaceable in the cylinder and connected to the spring mechanism, a supply line for pressure fluid communicating with the cylinder on one side of the piston, a plurality of discharge lines for the fluid communicating with the cylinder along the lateral wall thereof and controlled by the piston, and a slide valve controlling the discharge lines and constructed and arranged to leave only one discharge line open at a time, the slide valve being coupled to the shifting mechanism in such a manner that different positions of the one correspond to different positions of the other and the piston being coupled to the spring mechanism in such a manner that different adjustments of the governor correspond to different positions of the piston in the cylinder.

References Cited in the file of this patent

UNITED STATES PATENTS

| | | |
|---|---|---|
| 976,834 | Saurer | Nov. 22, 1910 |
| 1,250,219 | Pharo | Dec. 18, 1917 |
| 1,921,459 | Erban | Aug. 8, 1933 |
| 2,008,231 | Vincent | July 16, 1935 |
| 2,178,356 | Brunner | Oct. 31, 1939 |
| 2,362,655 | Mallory | Nov. 14, 1944 |
| 2,474,316 | May et al. | June 28, 1949 |
| 2,500,580 | Segsworth | Mar. 14, 1950 |

FOREIGN PATENTS

| | | |
|---|---|---|
| 12,646 | Great Britain | May 25, 1911 |
| 432,839 | Great Britain | Aug. 2, 1935 |
| 590,785 | France | June 23, 1925 |
| 640,026 | France | July 4, 1928 |
| 747,318 | France | June 14, 1933 |